United States Patent Office 3,551,167
Patented Dec. 29, 1970

3,551,167
TREATMENT OF FLESH FOR FOOD
John H. Mahon and Kermit F. Schlamb, Pittsburgh, Pa., assignors to Calgon Corporation, a corporation of Pennsylvania
No Drawing. Filed Jan. 26, 1967, Ser. No. 611,805
Int. Cl. A22c 21/00, 25/00; A23l 1/03
U.S. Cl. 99—107                                                                  4 Claims

ABSTRACT OF THE DISCLOSURE

This invention relates to the treatment of flesh in an aqueous slurry of sodium tripolyphosphate to prevent the formation of highly concentrated areas of phosphate known in the trade as "fish eyes." The slurry is preferably formed by mixing sodium tripolyphosphate having a major portion in the size range 20 mesh to 80 mesh in water to form a very fine creamy suspension, preferably completely hydrated.

---

This invention relates to treatment of flesh for food and particularly to a method of introducing phosphate into flesh which overcomes problems inherent in present treating practices.

It is common practice in the treatment of flesh from animals, fowl and fish to prevent loss of soluble protein to treat the flesh with dry powdered or granulated sodium tripolyphosphate or with suspension of sodium tripolyphosphate in water. It is well known that such treatments result in the presence of many small, translucent areas in the flesh because granules of phosphate cause gelatinization of the surrounding protein as a result of localized high concentration of phosphate in the meat product resulting in a characteristic known in the trade as "fish eyes" in the meat. These translucent "fish eyes" are unsightly and very undesirable in the final meat product.

We have discovered a method of overcoming these drawbacks. We have found that, if sodium tripolyphosphate in granular form for example having a major portion in the size range between about 20 mesh and 80 mesh is placed in water and permitted to stand, the material becomes very finely particularized in the form of a very fine creamy suspension, free of noticeable crystalline characteristics thus forming a smooth textureless slurry. If flesh to be treated is treated with this creamy suspension, or slurry, no localized phosphate concentrations occur and the resulting "fish eyes" are avoided. Moreover, the resulting treatment is much more uniform for the purpose intended. Preferably, the phosphate makes up from about 20% to about 50% of the slurry weight, the balance being water, however, we prefer to restrict the phosphate to the still narrower range of 25% to 35% by weight in the slurry. The tripolyphosphate of the slurry is permitted to stand before use until substantial hydration occurs.

The invention has been described in general terms in the foregoing statement along with certain objects, purposes and advantages to be achieved thereby. Other objects, purposes and advantages will be apparent from the following examples illustrative of our invention.

EXAMPLE I

Sodium tripolyphosphate of the size range 20 to 80 mesh was made into a 25% by weight slurry in water. The slurry was permitted to stand overnight (about 14 hours) and was found to be completely hydrated. The slurry after standing was a soft creamy suspension.

Raw, deboned turkey was coated with the slurry and formed into turkey rolls containing about 0.5% by weight sodium tripolyphosphate. Similar rolls were made with normal granular tripolyphosphate and with no added phosphate. The turkey rolls made with both the slurry of our invention and with normal granular tripolyphosphate were firmer, plumper and showed less external gelatinization and less weight loss after cooking. The turkey roll made with normal granular tripolyphosphate was found to have some widely separated gelatinized "fish eyes" as a result of undissolved particles of tripolyphosphate. These were undesirable and unpleasant but not harmful, however, the slurry treated turkey had no traces of such "fish eyes" or gelatinized areas within the turkey meat.

EXAMPLE II

Ground beef was mixed with about 0.5% by weight of sodium tripolyphosphate in the form of the slurry from Example I. Again ground beef was mixed with normal granular tripolyphosphate and a portion was retained untreated. Beef patties (hamburgers) were made from these three portions of beef and broiled in the usual manner. The beef treated with sodium tripolyphosphate lost less juices during cooking and remained plumper and more attractive than those with no phosphate. However, the hamburgers with normal granular sodium tripolyphosphate had scattered gelatinized areas or "fish eyes" which were entirely absent in the case of the slurry treated hamburger.

While we have illustrated certain preferred embodiments of our invention in the foregoing specification, it will be understood that this invention may be otherwise embodied within the scope of the following claims.

We claim:
1. The method of treating flesh comprising the steps of forming an aqueous slurry of sodium tripolyphosphate and adding about 0.5% of said slurry to the flesh to be treated.
2. The method as claimed in claim 1 wherein the slurry is formed with 20% to 50% by weight sodium tripolyphosphate in water and permitted to stand until a smooth textureless slurry is formed.
3. The method as claimed in claim 1 wherein the slurry is formed with 25% to 35% by weight of sodium tripolyphosphate in water and permitted to stand until a smooth textureless slurry is formed.
4. The method as claimed in claim 1 wherein the sodium tripolyphosphate is permitted to stand until substantial hydration occurs.

References Cited

UNITED STATES PATENTS

| | | | |
|---|---|---|---|
| 2,513,094 | 6/1950 | Hall | 99—159 |
| 3,104,170 | 9/1963 | Mahon | 99—107 |
| 3,147,123 | 9/1964 | Komarik | 99—107 |

HYMAN LORD, Primary Examiner

99—108, 111, 169

U.S. Cl. X.R.